United States Patent
Lu

(10) Patent No.: US 11,629,281 B2
(45) Date of Patent: Apr. 18, 2023

(54) METHODS AND SYSTEMS ASSOCIATED WITH LUBRICANT FOR DRILLING FLUIDS

(71) Applicant: HIGHLAND FLUID TECHNOLOGY, Houston, TX (US)

(72) Inventor: Shawn Lu, Katy, TX (US)

(73) Assignee: SciDev Energy Services, Inc., Houston, TX (US)

( * ) Notice: Subject to any disclaimer, the term of this patent is extended or adjusted under 35 U.S.C. 154(b) by 0 days.

(21) Appl. No.: 17/573,997

(22) Filed: Jan. 12, 2022

(65) Prior Publication Data

US 2022/0228049 A1 Jul. 21, 2022

Related U.S. Application Data

(60) Provisional application No. 63/138,652, filed on Jan. 18, 2021.

(51) Int. Cl.
| | |
|---|---|
| *C09K 8/12* | (2006.01) |
| *C10M 149/22* | (2006.01) |
| *C10M 143/10* | (2006.01) |
| *C10M 105/04* | (2006.01) |
| *C10M 161/00* | (2006.01) |
| *C10N 20/02* | (2006.01) |
| *C10N 30/02* | (2006.01) |

(52) U.S. Cl.
CPC .............. *C09K 8/12* (2013.01); *C10M 105/04* (2013.01); *C10M 143/10* (2013.01); *C10M 149/22* (2013.01); *C10M 161/00* (2013.01); *C09K 2208/34* (2013.01); *C10M 2203/1025* (2013.01); *C10M 2205/04* (2013.01); *C10N 2020/02* (2013.01); *C10N 2030/02* (2013.01)

(58) Field of Classification Search
CPC ...... C09K 8/12; C09K 2208/34; C09K 8/035; C10M 105/04; C10M 149/22; C10M 161/00; C10M 2203/1025; C10M 2205/04; C10M 143/10; C10M 169/044; C10N 2040/24
See application file for complete search history.

(56) References Cited

U.S. PATENT DOCUMENTS

| | | | | |
|---|---|---|---|---|
| 8,413,745 | B2 * | 4/2013 | Xiang | C09K 8/06 507/248 |
| 10,053,609 | B2 * | 8/2018 | Bening | C08G 81/02 |
| 2009/0227478 | A1 * | 9/2009 | Dino | C09K 8/32 507/118 |
| 2017/0190981 | A1 * | 7/2017 | Morsink | C09K 8/035 |
| 2019/0040294 | A1 * | 2/2019 | Hill, Jr. | A01N 25/10 |
| 2021/0002538 | A1 * | 1/2021 | Smith | C09K 8/035 |
| 2021/0122964 | A1 * | 4/2021 | Lee | C09K 8/035 |
| 2021/0155847 | A1 * | 5/2021 | Price | C09K 8/64 |

\* cited by examiner

*Primary Examiner* — Ellen M McAvoy
(74) *Attorney, Agent, or Firm* — Pierson Intellectual Property LLC

(57) ABSTRACT

A composition of a lubricant including a GTL hydrocarbon, fatty acid amine, and styrene block polymer.

5 Claims, 1 Drawing Sheet

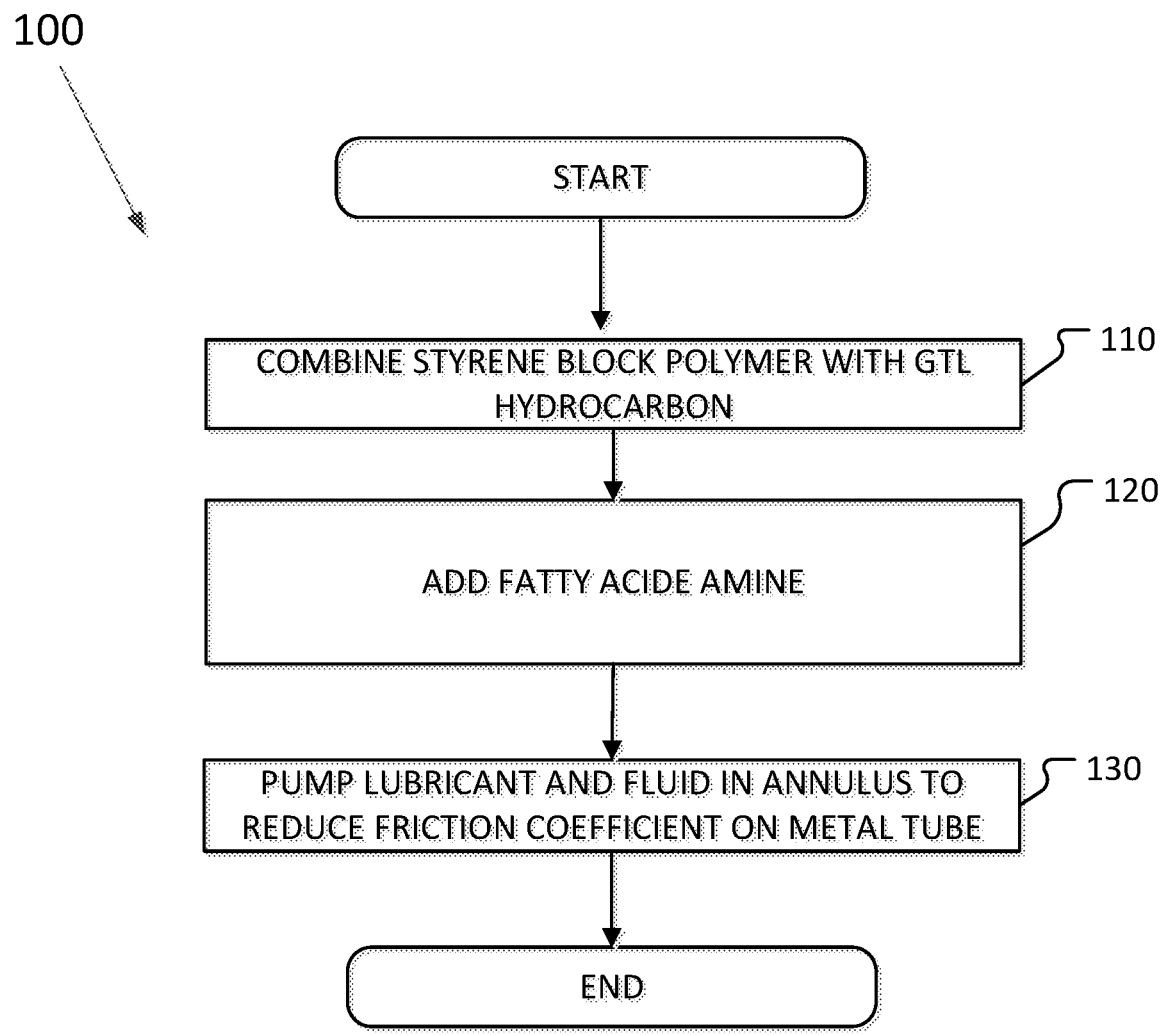

METHODS AND SYSTEMS ASSOCIATED WITH LUBRICANT FOR DRILLING FLUIDS

BACKGROUND INFORMATION

Field of the Disclosure

Examples of the present disclosure relate to systems and methods associated with lubricants for drilling fluids. More specifically, embodiments are directed towards lubricants comprised of a GTL hydrocarbon, fatty acid amine, and styrene block polymer.

Background

Drilling is a common operation in many industries from oil and gas, mining to construction. During the drilling, drilling fluids are often circulated in the wellbore to achieve various functions from transporting cuttings, maintaining formation pressures and cooling down the drill-bit. During drilling, friction control is a key parameter, and it often limits the rate of penetration. Various chemistries have been added in drilling fluids to reduce the friction between metal to metal and metal to formations.

Additionally, conventional drilling operations may follow a three or four interval design in shale plays. Lubricants can include a wide range of chemistry from simple hydrocarbons to specifically designed additives. Most lubricants are a blend of chemicals for performance an economic reason. Performance of lubricants is determined by the fluids treated with lubricants, metal or rock surfaces, and the operational parameters of the environment, such as temperature and pressure.

Effective lubricants are critical for water-based fluid, especially when the curve is being built prior to the horizontal or lateral interval. Vertical intervals are often drilled with a water-based fluid, and then a non-aqueous fluid is used for horizontal or lateral sections. In general, non-aqueous drilling fluids have a good lubricity. However, they may not be sufficient for longer reach wells. Especially, when the drilling fluids includes a high amount of drill solids.

Accordingly, needs exist for systems and methods associated with lubricants that can be used in water based drilling and non-aqueous drilling fluids, wherein the lubricant includes a GTL hydrocarbon, fatty acid amine, and styrene block polymer.

SUMMARY

Embodiments are directed towards a lubricant that includes a GTL hydrocarbon, fatty acid amine, and styrene block polymer. The lubricant has an excellent computability with various brines, and effectively reduces the friction coefficient in fresh water, monovalent brines, and divalent brines, including saturated brines. Embodiments may be used in all types of water-based drillings, as embodiments of the lubricant may effectively oil wet the surfaces. When the metal surface is oil wet, the solid surface may be in contact with an oil phase rather than a water or gas phase of the lubricant. Embodiments may also be used in oil and synthetic based non-aqueous drilling fluids and improve the mud properties and reduce the friction coefficient, which is critical for longer extended reach wells.

Embodiments described utilize three chemistries, including GTL oil, fatty acid polymers, and a styrene block polymer, to achieve optimized lubrication performances.

The GTL (gas to liquid) oil may be a highly pure paraffinic hydrocarbon. The paraffinic hydrocarbon may include ultra-low levels of Sulphur, nitrogen, or aromatic content. The GTL hydrocarbon may have a low pour point, high flash point, high viscosity index, and outstanding thermal stability. In embodiments, the lubricant may include 5-80% of the selected GTL hydrocarbon.

The fatty acid amine nitrogen may be derivatives of fatty acids, olefins, or alcohols prepared from natural sources, fats and oils, or petrochemical raw materials. In embodiments, the fatty acid polyamine may have good oil solubility, and can effectively oil wet solid surfaces.

The styrene block polymer may be a type of effective oil viscosifier, which may be a thermoplastic elastomer. In embodiments, the lubricant may include <1% of a styrene block polymer.

In embodiments, to form the lubricant the styrene block polymer may initially be combined with the GTL hydrocarbon, and then the fatty acid amine may be added to the composition. This lubricant may allow for a metal surface to become oil wet after exposed to water containing up to 3% of the composition. The lubricant may be configured to reduce the friction co-efficient of the metal surface of the composition by greater than 50% after the volume of the lubricant in the water is greater than 1%. In embodiments, after an increase in heat of the environment with the water and the lubricant, the reduction in friction co-efficient may increase. For example, after hot roll at 260 degrees Fahrenheit for sixteen hours of a composition water including a 3% volume of the lubricant may reduce the friction coefficient of the metal surface by 70%.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following FIGURES, wherein like reference numerals refer to like parts throughout the various views unless otherwise specified.

FIG. 1 depicts a method of making a lubricant, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the FIGURES may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

Embodiments described utilize three chemistries, including GTL oil, fatty acid polymers, and a styrene block polymer, to achieve optimized lubrication performances. For example, below is a formula for a styrene-ethylene-propylene-styrene copolymer.

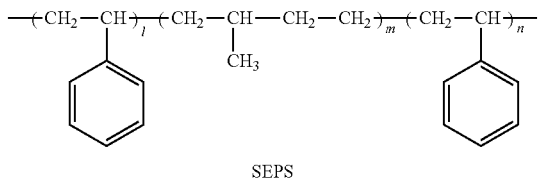

SEPS

The GTL (gas to liquid) oil may be a highly pure paraffinic hydrocarbon. In embodiments, the GTL oil may be configured to provides lubrication by itself due to the non-polarity of the product, is biodegradable, and provides an environmental benefit. The paraffinic hydrocarbon may include ultra-low, or non-detectable, levels of Sulphur, nitrogen, or aromatic content. The GTL hydrocarbon may have a low pour point, high flash point, low viscosity, and outstanding thermal stability. In embodiments, the lubricant may include 5-80% of the selected GTL hydrocarbon, and the pour point of the GTL may be less than −20° C.

The fatty acid amine nitrogen may be derivatives of fatty acids, olefins, or alcohols prepared from natural sources, fats and oils, or petrochemical raw materials. In embodiments, the fatty acid polyamine may have good oil solubility, and can effectively oil wet solid surfaces. The fatty acid amine may be configured to coat the surface more effectively.

The styrene block polymer may be a type of effective oil viscosifier, which may be a thermoplastic elastomer. In embodiments, the lubricant may include <1% of a styrene block polymer. In embodiments, the styrene block polymer may increase the base oil viscosity and it changes the fluid regime and reduces the friction.

Table 1 reproduced below depicts the friction of Coefficient of fresh water, saturated NaCL and a high TDS (total Dissolved Solids) including 3% of embodiments of lubricants. The results were tested by a lubricity meter.

TABLE 1

|  | COF | COF Reduction |
|---|---|---|
| fresh water with no lubricant | 0.34 |  |
| fresh water with 3% lubricant | 0.096 | 71.8% |
| saturated NaCl with 3% lubricant | 0.103 | 69.7% |
| Produced water (7%wt CaC2 and 9% NaCl) with 3% lubricant | 0.095 | 72.1% |

Table 2 reproduced below depicts the reduction of the initial coefficient of friction of a field brine that include embodiments of the lubricant against a metal surface. Additionally, Table 2 includes the reduction of friction coefficient of fluids that include embodiments of the lubricant after hot rolling. The results were captured by a lubricity meter. As depicted in Table 2, compositions comprised of 1% lubricant had initially less than 50% reduction in the friction coefficient, while compositions comprised of 3% lubricant had initially greater than 50% reductions of lubricant. As further depicted, after environmental effects, the reduction of friction coefficient of composition comprised of 2% or greater lubricant remained fairly constant at around 70% reduction.

| vol % of Lubricant | Reduction in friction coefficient |
|---|---|
| Initial | |
| 1% | 38% |
| 2% | 56% |
| 3% | 63% |
| After Hot roll at 260° F. for 16 hours | |
| 1% | 40% |
| 2% | 70% |
| 3% | 70% |

As depicted in Table 2, the reduction in friction coefficient increased as a metallic surface is heated at a high enough temperature to permit recrystallization.

In a field trial for diamond core drilling, the lubricant was used at 1.5% of the drilling fluid. A 50% reduction in torque was reported while a benchmark product only achieved a 20% reduction at 1.5% dosage.

FIG. 1 depicts a method 100 for creating lubricant for use in a wellbore, according to an embodiment. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 1 and described below is not intended to be limiting.

At operation 110, a styrene block polymer may initially be combined with a GTL hydrocarbon.

At operation 120, a fatty acid amine may be added to the composition including the GTL hydrocarbon and the styrene block polymer.

At operation 130, the lubricant may be pumped downhole along with fluids to reduce the friction coefficient on tubing being pumped along with the lubricant. In embodiments, the lubricant may be pumped downhole in an annulus between the wellbore and the metal surface.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the FIGURES provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A lubricant composition comprised of:
 water;
 a lubricant including a gas to liquid hydrocarbon,
 a fatty acid polyamine, and
 a styrene block polymer, the lubricant being formed of five to eighty percent of the gas to liquid hydrocarbon and less than one percent styrene block polymer, wherein the water is mixed with the lubricant to form a water based drilling fluid, the water based drilling fluid including at least three percent of the lubricant, wherein water based drilling fluid is configured to lubricate a metal surface within an annulus between a wellbore and tubing by reducing a friction co-efficient of the metal surface by at least fifty percent.

2. The lubricant of claim 1, wherein the lubricant is formed of more than ten percent of the fatty acid polyamine.

3. The lubricant of claim 1, wherein the gas to liquid hydrocarbon is a paraffinic hydrocarbon.

4. The lubricant of claim 1, wherein the styrene block polymer is an oil viscosifier.

5. A method of forming a lubricant comprising:
 forming a lubricant by mixing a gas to liquid hydrocarbon, a styrene block polymer, and a fatty acid polyamine;
 pumping the lubricant downhole with water to form a water based drilling fluid, the lubricant being formed of five to eighty percent of the gas to liquid hydrocarbon and less than one percent styrene block polymer, wherein the water is mixed with the lubricant to form a water based drilling fluid, the water based drilling fluid including at least three percent of the lubricant;
 lubricating, via the water-based drilling fluid, a metal surface within an annulus between a wellbore and tubing by reducing a friction co-efficient of the metal surface by at least fifty percent.

\* \* \* \* \*